J. H. WHITLING.
SOLDERING-IRON HEATER.
No. 180,811.  Patented Aug. 8, 1876.
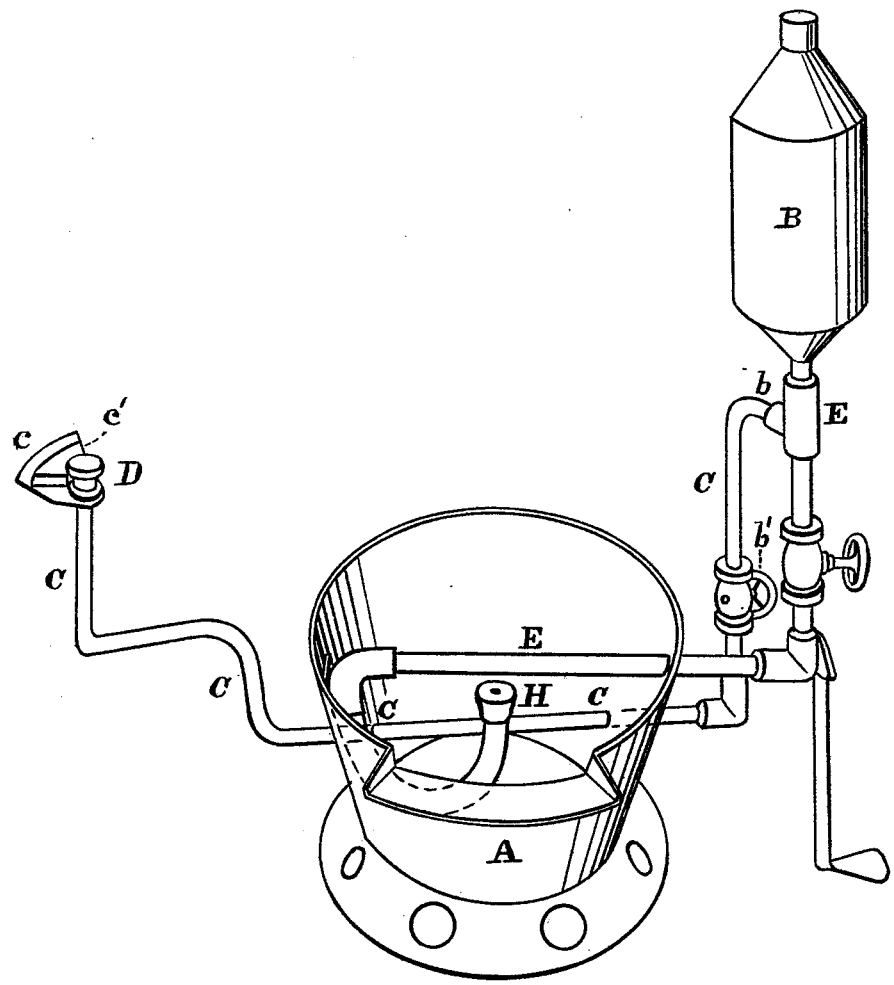
Witnesses:
E. P. Goodwin
G. B. Fowler
Inventor:
John H. Whitling
by W. Burris
Attorney.

UNITED STATES PATENT OFFICE.

JOHN H. WHITLING, OF SALEM, OHIO.

IMPROVEMENT IN SOLDERING-IRON HEATERS.

Specification forming part of Letters Patent No. 180,811, dated August 8, 1876; application filed April 27, 1876.

*To all whom it may concern:*

Be it known that I, JOHN H. WHITLING, of Salem, in the county of Columbiana and State of Ohio, have invented certain new and useful Improvements in Soldering-Machines; and do hereby declare that the following is a full, clear, and exact description thereof, which will enable others skilled in the art to which it pertains to make and use the same, reference being had to the accompanying drawings, and to the letters of reference marked thereon, which form a part of this specification.

The drawing represents a perspective view of the fire-pot with the top removed, showing the burner for giving light and pipe extended through the furnace and connected with the oil-reservoir.

My invention relates to soldering fire-pots heated by gasoline or other similar oils; and it consists of a burner for giving light, adjusted on a pipe extended through the heating-furnace, and connected with the oil-reservoir, as hereinafter more fully described.

I use a fire-pot, A, having a reservoir, B, pipe E, and burner H, and other devices pertaining to the fire-pot, all made substantially as described in the Patent No. 173,095, granted to me February 1, 1876.

C represents a pipe, connected with the furnace-pipe E at $b$, and provided with a valve, $b'$. This pipe C is extended through the heating-furnace of the fire-pot, as shown in the drawing, for the purpose of heating the oil to generate gas for the burner to give light to the workman. D is the burner on the end of the pipe C, provided with small holes for the gas-jets, and having reflectors $c$ $c'$.

The pipe C is bent to adjust the burner in proper position for giving light to the workman at night or in dark places.

When the light is not needed the supply of oil in the pipe C is cut off by the valve $b'$.

What I claim as new, and desire to secure by Letters Patent, is—

1. In combination with the soldering fire-pot A, having a heating-burner, H, the illuminating-burner D on pipe C, adjusted substantially as and for the purposes described.

2. The pipe C, having valve $b'$, and burner D, in combination with fire-pot A, reservoir B, pipe E, and burner H, substantially as and for the purposes described.

In testimony that I claim the foregoing as my own invention I affix my signature in presence of two witnesses.

JOHN H. WHITLING.

Witnesses:
ADAM G. MILLER,
W. C. BERINGER.